US007339995B2

(12) United States Patent
Renaud et al.

(10) Patent No.: US 7,339,995 B2
(45) Date of Patent: Mar. 4, 2008

(54) RECEIVER SYMBOL ALIGNMENT FOR A SERIAL POINT TO POINT LINK

(75) Inventors: Lyonel Renaud, Gilbert, AZ (US); David M. Puffer, Tempe, AZ (US); Sarath Kotamreddy, Chandler, AZ (US); Suneel G. Mitbander, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 786 days.

(21) Appl. No.: 10/750,081

(22) Filed: Dec. 31, 2003

(65) Prior Publication Data

US 2005/0144342 A1 Jun. 30, 2005

(51) Int. Cl.
*H04B 14/04* (2006.01)
(52) U.S. Cl. .................................................... 375/242
(58) Field of Classification Search ................ 375/242, 375/354, 355, 359, 365, 366, 368; 370/395.62, 370/507; 485/265; 702/89; 713/375, 400; 708/525, 306; 710/5.2
See application file for complete search history.

(56) References Cited

U.S. PATENT DOCUMENTS

| 2002/0009049 | A1 | 1/2002 | Nomura |
| 2002/0138675 | A1 | 9/2002 | Mann |
| 2003/0099260 | A1 | 5/2003 | Bunton |
| 2003/0161429 | A1 | 8/2003 | Chiang |
| 2004/0264612 | A1* | 12/2004 | Allen ......................... 375/354 |
| 2006/0209735 | A1* | 9/2006 | Evoy ......................... 370/315 |

FOREIGN PATENT DOCUMENTS

EP  1 152 573 A2  11/2001

OTHER PUBLICATIONS

Allen, U.S. Appl. No. 60/451,799, Mar. 4, 2003.*
Evoy, U.S. Appl. No. 60/494,294, Aug. 11, 2003.*
Ravi Budruk, et al., "PCI Express System Architecture", PC System Architecture Series, MindShare, Inc., Addison-Wesley copyright 2004, ISBN #0-3212-15630-7 (Contents, pp. vii-xxxvii; and Part Three The Physical Layer—Chapter 11 Physical Layer Logic, pp. 397-451).

(Continued)

*Primary Examiner*—Sam K. Ahn
(74) *Attorney, Agent, or Firm*—Blakely, Sokoloff, Taylor & Zafman LLP

(57) ABSTRACT

A stream of bits are received in a first integrated circuit (IC) device, where the stream represents a sequence of symbols transmitted by a second IC device over a serial point to point link that couples the two devices. First and second M-bit sections of the stream are compared to a non-data symbol. The second M-bit section is offset by one bit in the stream relative to the first section. If there is a match between the first section and the non-data symbol, then a flag indicating symbol alignment is asserted. Each of multiple, consecutive, non overlapping M-bit sections that follow the first section are then to be treated as separate symbols. Other embodiments are also described and claimed.

16 Claims, 8 Drawing Sheets

OTHER PUBLICATIONS

"PCI Express™ Base Specification Revision 1.0a", Apr. 15, 2003 (Incorporated Errata C1-C67 and E1-E4.17) PCI Express (Contents, pp. 3-8; Chapter 4-4. Physical Layer Specification, pp. 151-201; and Chapter B-B. Symbol Encoding, pp. 411-420).

PCT International Search Report, dated May 18, 2005 (International Application No. PCT/US2004/043801, International Filing Date Dec. 23, 2004) (12 pages).

"InfiniBand Retiming Repeater Core", Oct. 24, 2003, pp. 1-2, XP002328950, Retrieved from Internet: URL:http://web.archive.org/web/20031024032212/http://nobug.com/inifiniband.htm—retrieved May 20, 2005 (1 sheet).

\* cited by examiner

RECEIVER SYMBOL ALIGNMENT FOR A SERIAL POINT TO POINT LINK

BACKGROUND

An embodiment of the invention is generally related to serial, point to point interconnect technology suitable for communicatively coupling elements of an electronic system, and particularly to those which have certain aspects that are in accordance with the PCI Express Base Specification 1.0a (Errata dated 7 Oct. 2003) ("PCI Express"). Other embodiments are also described.

An electronic system is composed of several elements that are designed to communicate with one another over an input/output (I/O) interconnect of the system. For instance, a modern computer system may include the following elements: a processor, main memory, and a system interface (also referred to as a system chipset). An element may include one or more integrated circuit (IC) devices. For example, the system chipset may have a memory controller hub (MCH) device that allows the processor to communicate with system memory and a graphics element. In addition, an I/O controller hub (ICH) device may be provided that connects the processor and memory, via the MCH, to other elements of the computer system such as mass storage devices and peripheral devices. In that case, a separate, point to point link such as one defined by PCI Express may be used to allow bi-directional communication between a pair of devices, e.g. the processor and the MCH, the MCH and the graphics element, and the ICH and the mass storage device.

A PCI Express point to point link may have one or more lanes that can operate simultaneously. Each lane has dual, unidirectional paths, which are also simultaneously operable. Each path may have a single set of transmitter and receiver pairs (e.g., a transmitter in a port of Device A, a receiver in a port of Device B). In that case, the transmitter and receiver may drive and sense a transmission medium such as a pair of metal traces in a printed wiring board that may traverse a board-to-board connector. Alternatively, other transmission media may be provided, such as optical fiber.

A point to point link serves to transport various types of information between devices. At a so-called "higher layer", however, communications between peers in two devices (also referred to as a requester and a completer) may be conducted using transactions. For example, there are memory transactions that transfer data to or from a memory-mapped location. Under PCI Express, there are also message transactions that communicate miscellaneous messages and can be used for functions like interrupt signaling, error signaling, and power management.

There may be three abstract layers that "build" a transaction. The first layer may be the Transaction Layer, which begins the process of turning a request or completion data coming from a device core into a data packet for a transaction. The second architectural build layer is called the Data Link Layer; it ensures that packets going back and forth across a link are received properly (via techniques such as error control coding). The third layer is called the Physical Layer. This layer is responsible for the actual transmitting and receiving of the packet across the link. The Physical Layer in a given device interacts with its Data Link Layer (in the same device) on one side, and with the metal traces, optical fiber, or other transmission medium that is part of the link, on another side. The Physical Layer may contain circuitry for the transmitters and receivers, parallel to serial and serial to parallel converters, frequency and phase control circuits, and impedance matching circuitry. It may also contain circuitry for logic functions needed for its initialization and maintenance. A layered architecture may permit easier upgrades by, for example, allowing reuse of essentially the same Transaction and Data Link Layers, while upgrading the Physical Layer (e.g., increasing transmit and receive clock frequencies).

An example of the behavior of the Physical Layer is now given. Once power up occurs, the Physical Layers on both Device A and Device B are responsible for initializing the link and making it ready for transactions. This initialization process may include determining how many lanes should be used for the link, and at what data rate the link should operate. Sometime after the link is properly initialized, a memory read request is initiated in Device A. Eventually, a packet that includes this read request arrives at Device A's Physical Layer, including headers, error control information, and sequence numbers added by the higher layers. The Physical Layer then takes this packet of data and transforms it into a serial data stream (perhaps after adding framing data to it), and transmits the stream using, for example, an electrical, differential signal having predefined timing rules.

Once the Physical Layer in Device B sees the signal appear at its receiver input, it samples the signal to recover the data stream, and builds the stream back into a data packet (e.g., after removing the framing). The packet is then passed up to the Data Link Layer in Device B, which strips the headers and checks for errors; if there are no errors, the packet is passed up to the Transaction Layer where the memory read request is extracted and then sent to the appropriate logic function to access the locations specified in the request.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
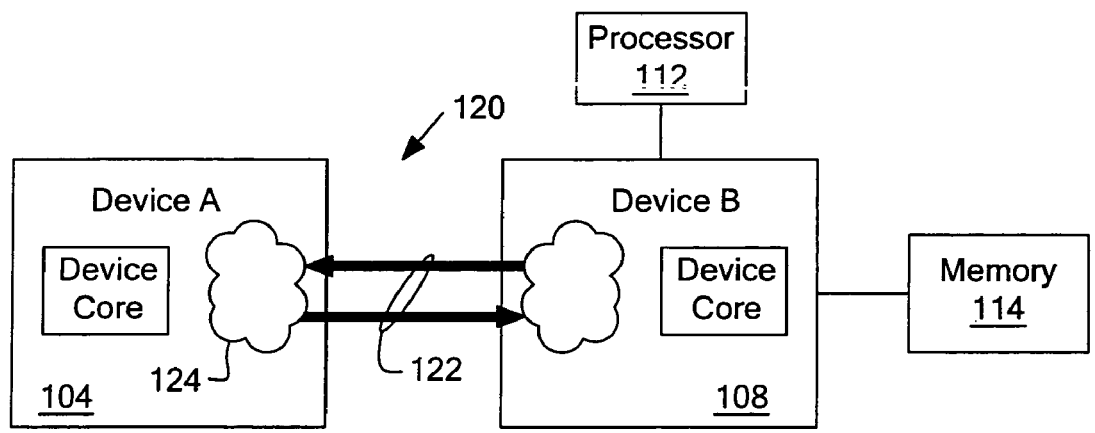
FIG. 1 illustrates a pair of integrated circuit devices that are coupled to each other via a serial point to point link.

An embodiment of the invention is directed to receiver symbol alignment for a serial, point to point link. FIG. 1 illustrates a pair of integrated circuit devices that are coupled to each other via a serial point to point link. The IC devices 104 (Device A) and 108 (Device B) may be part of a computer system that contains a processor 112 and main memory 114. In this example, a serial point to point link 120 is used to communicatively couple the core of Device B with that of Device A. The link 120 has dual, unidirectional paths 122, with link interface 124 that serves to interface with the device core of each respective Device A and B. In this embodiment, Device B is referred to as the root complex of the computer system and provides the processor 112 with I/O access to, for instance, a graphics element in Device A. The root complex may be partitioned into a graphics and memory controller hub (GMCH) and an I/O controller hub (ICH). The ICH would act as a further interface between the GMCH and other I/O devices of the system, including a non-volatile mass storage device, a pointing device such as a track pad or mouse, and a network interface controller (not shown). The point to point link 120 may be duplicated for communicatively coupling the Device B to the processor 112 and the main memory 114. Other platform architectures that feature the point to point link 120 are also possible.

Figure 2:
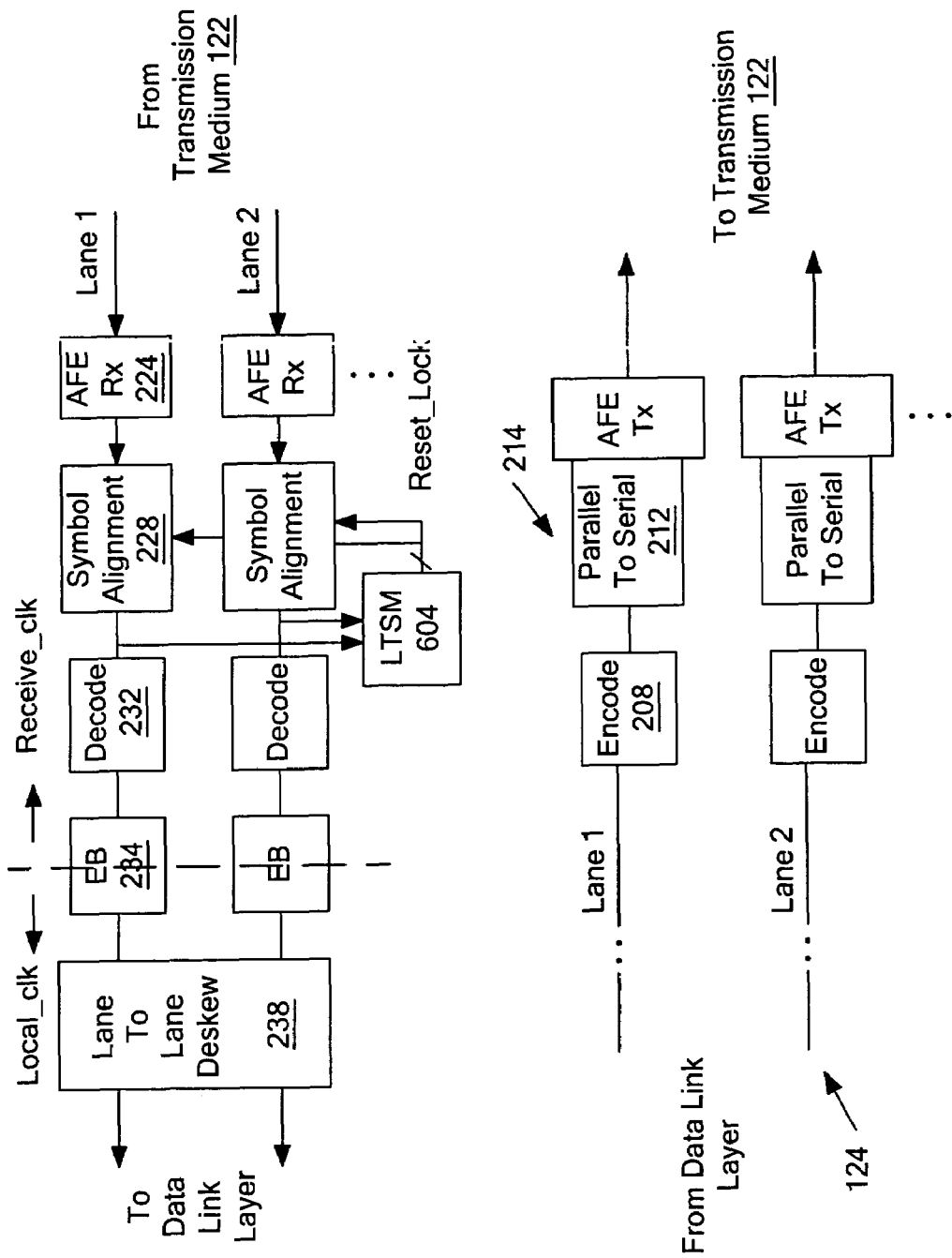
FIG. 2 illustrates a block diagram of part of the link interface circuitry that may be used to implement the serial point to point link in an integrated circuit device.

The interface 124 of FIG. 1 may be viewed as implementing the multiple layer architecture (described above in the Background) for a serial point to point link. Some details of the interface 124 are illustrated in FIG. 2. The interface 124 supports independent transmit and receive paths between the transmission medium 122 and the Data Link Layer of its respective device 104, 108. In the transmit path, information in the form of data packets arrive from the Data Link Layer and are divided into symbols that are encoded by an encode block 208. A purpose of the encoding by block 208 is to embed a clock signal so that a separate clock signal need not be transmitted into the transmission medium 122. This encoding may be the well known 8B-10B where an eight bit quantity is converted into a 10 bit quantity; other encoding schemes are possible. In some cases, such as where a separate strobe or clock signal is transmitted in the medium 122, there may be no need for such encoding.

Following encoding in block 208, the units of data (referred to here as symbols) are processed by a parallel to serial block 212 of an analog front end (AFE) transmit block 214 to yield a stream of bits. Note that a "bit" as used here may represent more than two different states, e.g. a binary bit, a ternary bit, etc. The term "bit" is used merely here for convenience and is not intended to be limited to a binary bit. The bit stream is then driven into the transmission medium 122. As explained above in the Background, this transmission medium may be a pair of metal traces formed in a printed wiring board. Other forms of the transmission medium 122 may alternatively be used, such as an optical fiber.

The series of blocks 208-214 may serve a single lane of the point to point link 120 (FIG. 1). In general, there may be more than one lane in the point to point link 120, so that a packet received from the Data Link Layer may be "striped" across multiple lines for transmission.

Turning now to the receive side of the interface 124 shown in FIG. 2, each lane has its associated AFE receive block 224, which serves to receive a stream of information from the transmission medium 122, by for example sampling a signal in the transmission medium 122. The AFE receive block 224 translates between signaling of the transmission medium 122 and signaling of the IC device 104 (e.g., on-chip, complementary metal oxide semiconductor, CMOS, logic signaling). As will be explained below, the stream of information represents sequences of M-bit symbols (where M is an integer greater than 1) that have been transmitted by the Device B over the serial point to point link 120 (see FIG. 1).

The stream of bits provided by the AFE receive block 224 is fed to symbol alignment logic 228 which serves to align or lock onto the symbols that have been received. In other words, and as will be explained below, the symbol alignment logic 228 will demarcate the correct symbol boundaries within the received bit stream, for use by subsequent sections of the Physical Layer in the device 104. The symbol-aligned bit stream may then be fed to decode block 232 which undoes the encoding performed by encode block 208 (e.g., 10B-8B decoding, to yield symbols of information consisting of eight binary bits each). The decoded symbols are then fed to an elastic buffer, EB 234. The EB 234 serves to compensate for any differences in the tolerance of the rate at which the symbols were transmitted in Device B and a local clock signal (local_clk) of Device A. The local_clk is used to unload symbols from the EB 234, as well as in some cases operate the lane to lane deskew logic 238 (in the case where the link 120 is composed of more than one lane). It should be noted that the decode block 232 (if provided) may be placed further downstream, i.e. at the output of the EB 234 or at the output of the deskew logic 238.

Figure 3:
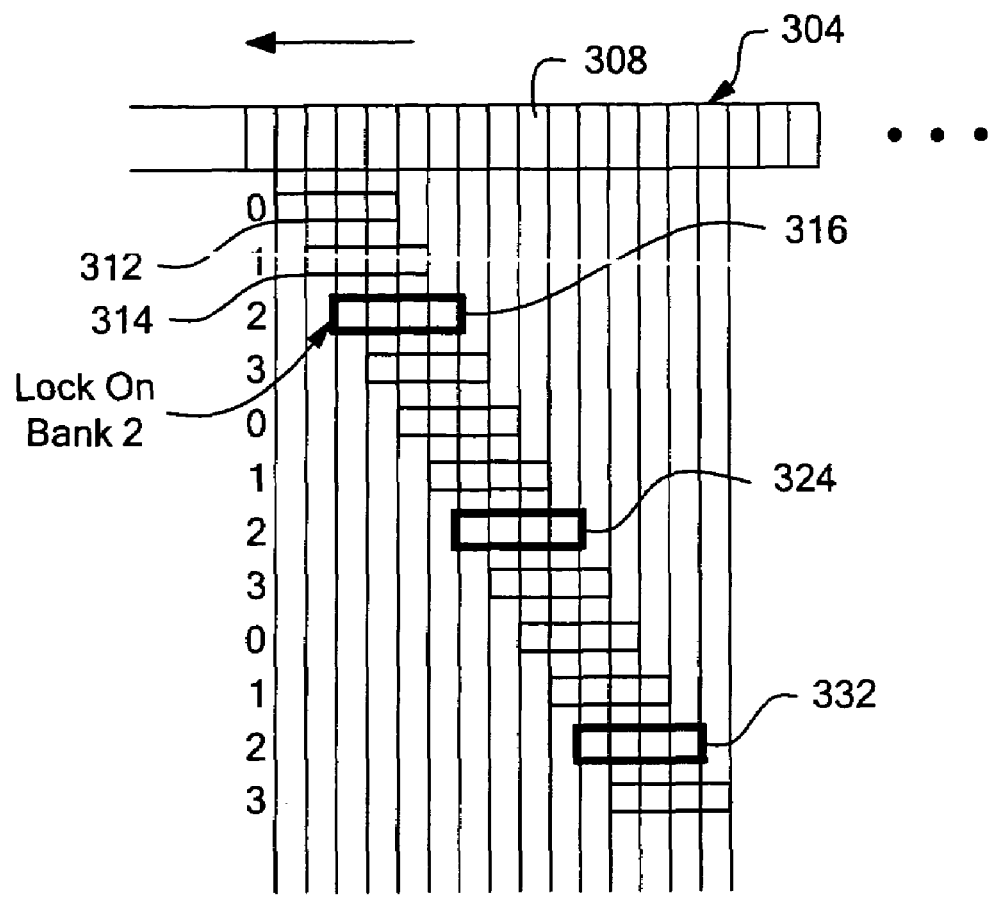
FIG. 3 depicts a process for symbol alignment in a receiver of an integrated circuit device.

To help explain how the symbol alignment logic 228 performs its task, FIG. 3 depicts an example received stream of information 304 that has been transmitted by Device B. The stream of information 304 may consist of a sequence of bits 308 (e.g., binary bits). Although the Device B may have had the knowledge that each M-bit section of the stream being transmitted was a separate symbol, it may not have demarcated each symbol in the transmission. The symbol may be a "data" symbol that represents some payload that has been sourced by the Data Link Layer, Transaction Layer or some other higher layer such as the device core. Alternatively, a symbol may be a "non-data" symbol, e.g. a special symbol generated by one of the Physical, Data Link, or Transaction Layers, to achieve some type of control over the information that is being transmitted over the serial point to point link. Several examples of such non-data symbols will be given below as PCI Express special symbols.

PCI Express defines a number of special symbols that are added to the packets that are being communicated. For instance, special symbols may be added to mark the start and stop of a packet. This is done to let the receiving device know where one packet starts and where it ends. Different special symbols are added for packets that originate in the Transaction Layer than in the Data Link Layer. In addition, there is a special symbol called "SKP" (skip) which is to be used by the Physical Layer for compensating for small differences in the operating data rates of two communicating ports. There is also a special symbol called "COM" (comma) that is to be used for lane and link initialization by the Physical Layer.

Still referring to FIG. 3, the method for aligning to the symbols that are in the received stream of information 304 involves comparing M-bit sections of the stream to a predefined, non-data symbol. Thus, in FIG. 3, a series of M-bit sections 312, 314, 316, . . . 332 are illustrated, where each section is offset by one bit in the stream relative to its immediately adjacent section as shown. Thus, for example, M-bit section 314 is offset, and in this case follows in time, an M-bit section 312 by one bit.

If there is a match between an M-bit section of the stream of information 304 and the predefined, non-data symbol, then the symbol alignment logic 228 (see FIG. 2) asserts a flag indicating symbol alignment. Thereafter, the IC device 104 (Device A) treats each consecutive, non overlapping M-bit section that follows the matching section to be a separate symbol (for the given lane of a particular point to point link). In this example, it is the M-bit section 316 that immediately follows the M-bit section 314 which has matched, such that M-bit sections 316, 324, 332, etc. are considered separate symbols. Each of these symbols may then be decoded or otherwise processed as a whole by subsequent logic (e.g., decode block 232, see FIG. 2).

In the example of FIG. 3, it was assumed that each M-bit section consists of 4-bits that may be stored in one of a set of four storage banks numbered 0-3. Of course, the use of 4-bits is merely an example as the techniques here may be applied to any M-bit section having any number of bits greater than one. If the symbol alignment logic 228 is capable of capturing such 4-bit sections sequentially, working through banks 0-3 in sequence, and then repeating with bank 0, it becomes clear that when there is a match with a particular 4-bit section, subsequent 4-bit sections (deemed symbols now) will be available in the same bank as the first matching section. Thus, in FIG. 3, the alignment logic is said to "lock" on bank 2 which contains the M-bit section 316, and it is this bank that will subsequently contain M-bit sections 324, 332, etc. It is thus from bank 2 that each symbol will be forwarded to the next symbol processing logic block. An example of symbol alignment logic for processing 10-bit sections (where each symbol is presumed to be 10-bits wide) is shown in FIG. 4.

Figure 4A:
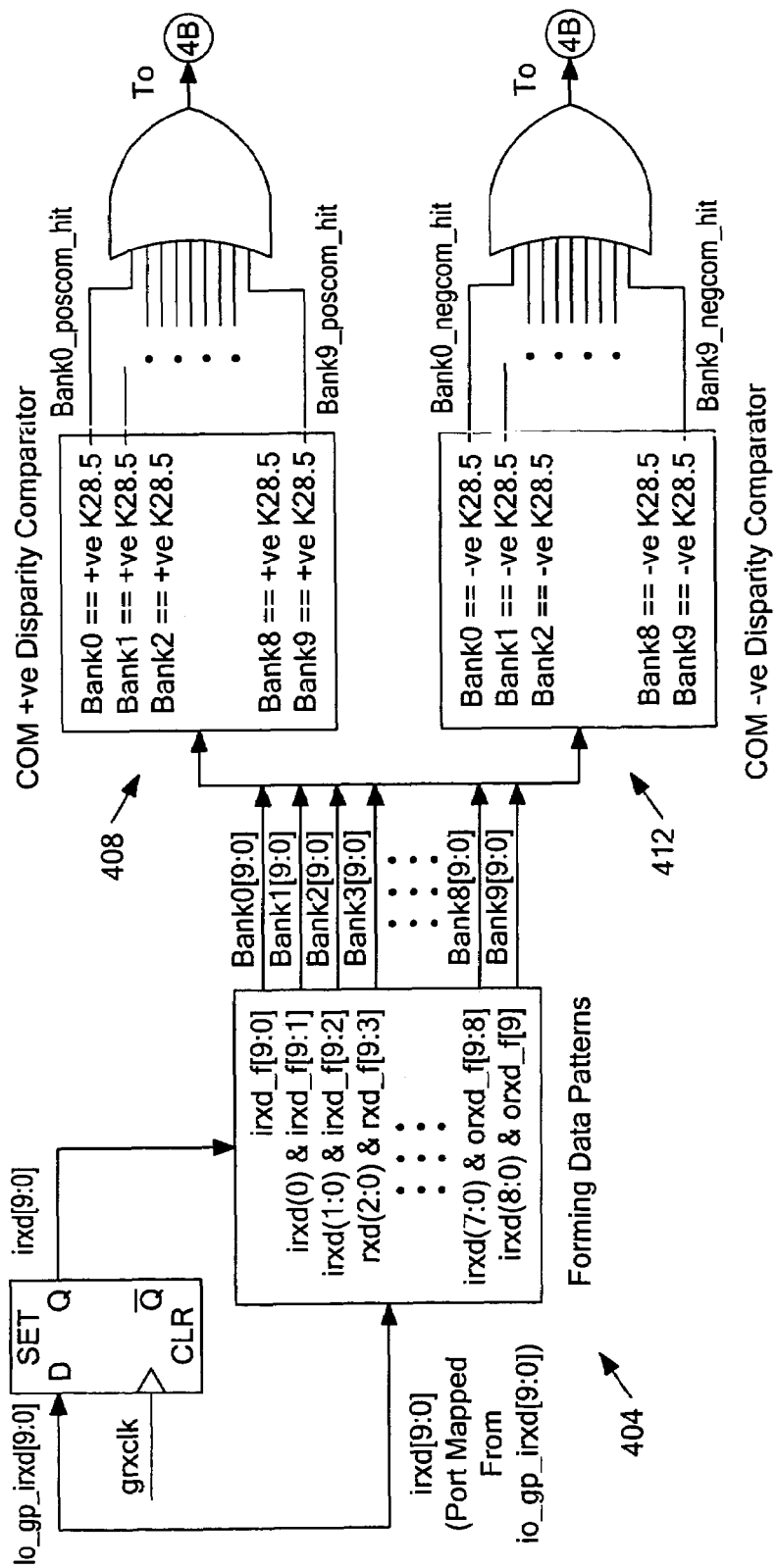
FIGS. 4A and 4B are circuit diagrams of an example symbol alignment logic.
Figure 4B:
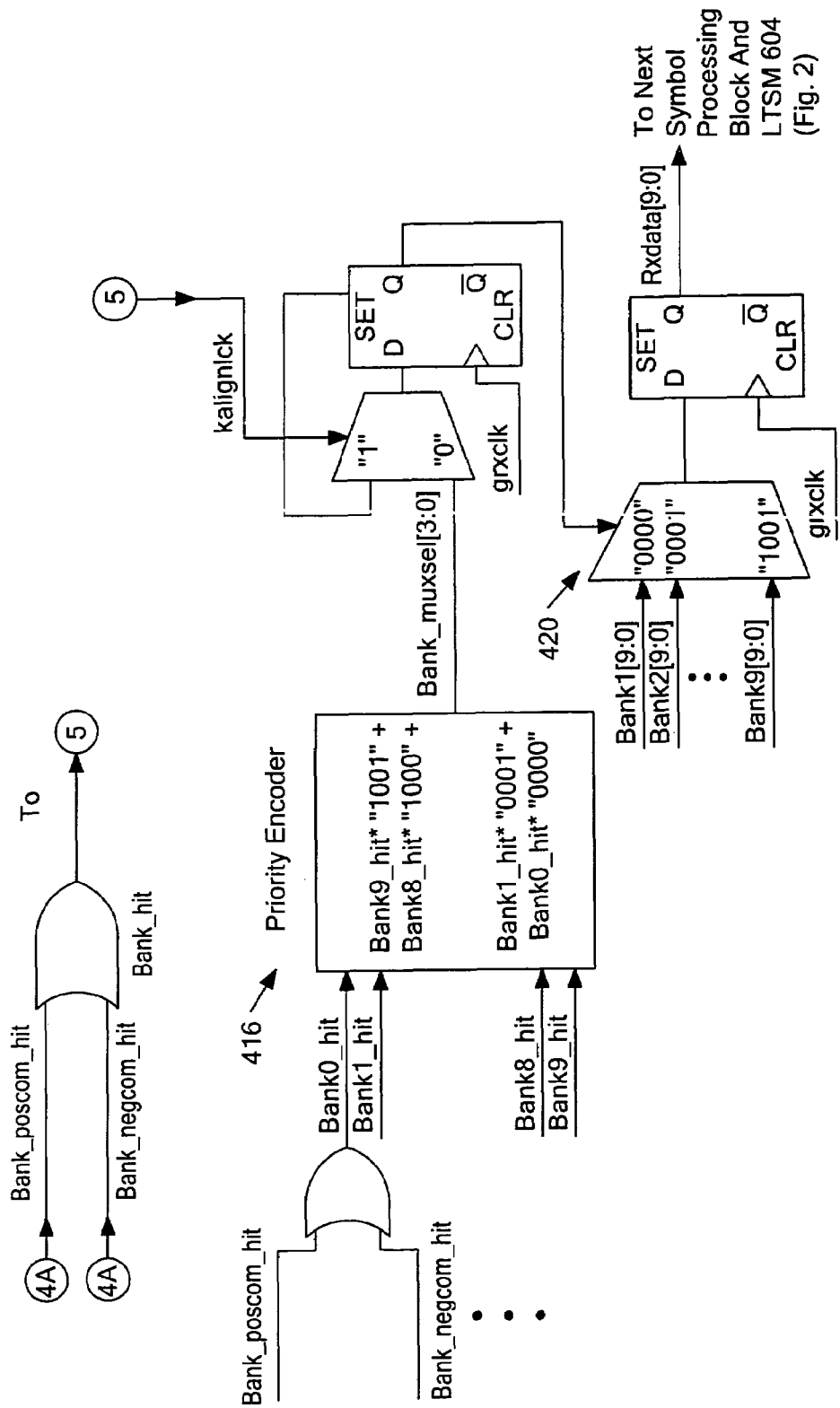

Turning now to FIGS. 4A and 4B, a portion of the symbol alignment logic 228 is shown for an embodiment of the invention that uses special, non-data symbols provided by PCI Express. A section formation part 404 is responsible for capturing multiple, M-bit sections of the stream using M (here 10) storage banks. Note how the clocking of each bit in the stream that is received from the AFE is performed according to a receive clock signal, grxclk. This clock signal has been derived based on a clock signal that was transmitted or embedded in the transmission medium 122 by the Device B (see FIG. 2). Each cycle of the grxclk may be used to shift into the next storage bank the next bit in the stream of information coming from the AFE.

The captured 10-bit sections or patterns are compared against a relatively unique character, e.g. COM (comma) defined under PCI Express. Since under PCI Express, a given character or symbol may have two different forms, one having positive disparity and the other having negative disparity (in view of the differential signaling over the transmission medium 122), two banks of comparators 408, 412 are provided to make the comparison. Although the COM is used as the special, non-data symbol in this case, another non-data symbol that is designed to be unlikely to match any group of M consecutive bits in the stream (unless the transmitting device had knowledge that it was transmitting this non-data symbol) may alternatively be used for purposes of symbol alignment here.

Each of the comparators 408, 412 provides M bank hit signals (in this case each provides ten bank hit signals) in response to making a comparison with COM. Note that the results of the positive and negative disparity comparisons for each bank are ORed, so that the comparator logic can work with either positive or negative disparity in the received stream of information. This leads to M bank hit signals that are fed to the input of a priority encoder 416. The priority encoder 416 is designed to give priority to the earlier one of two or more hits, so that a single bank is selected as the one to lock. The output of the encoder 416 is coupled to control the output of a multiplexer 420, being a M bit symbol now. The symbol Rxdata [9:0] is then forwarded to the next symbol processing block (here decode block 232, see FIG. 2) in accordance with the receive clock, grxclk, as shown.

Figure 5:
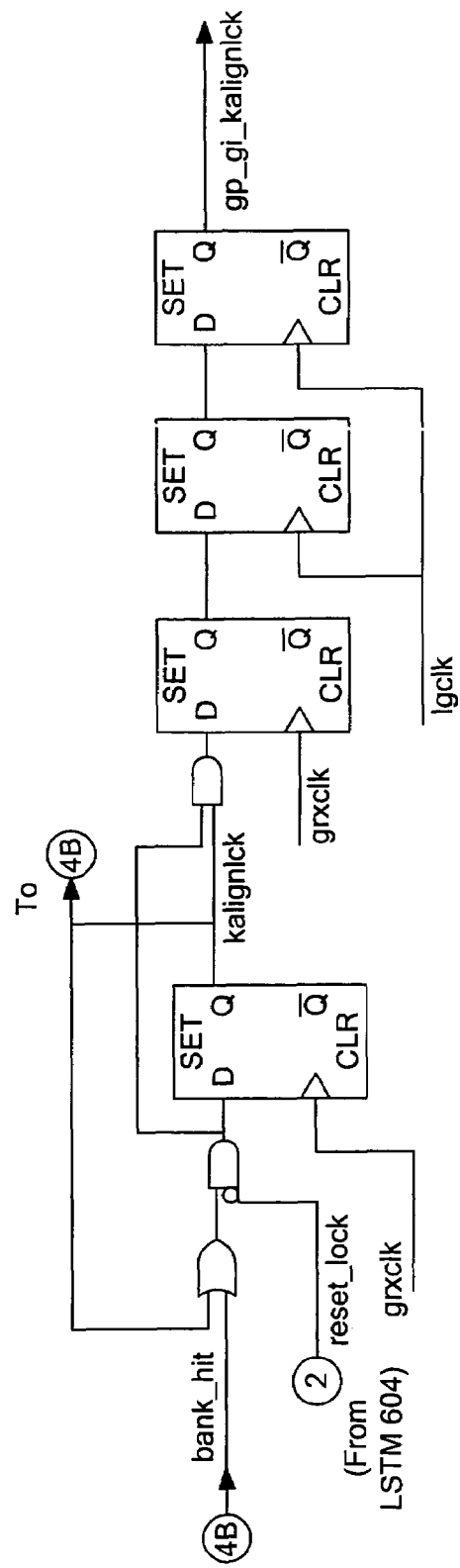
FIG. 5 shows an example logic circuit for generating a symbol lock flag.

Turning now to FIG. 5, this figure illustrates example logic circuitry for generating an align or lock flag, by the symbol alignment logic. In this case, an intermediate lock flag signal, kalignlck, is generated in response to a bank hit signal (that one of the data banks now contains the matching non-data symbol). The lock flag generation circuitry in FIG. 5 thus propagates the bank_hit signal through a register stage, and in the process converting the signal into the local clock domain of the IC device 104 (see FIG. 2). The local clock in this case is represented by lgclk and the final, lock signal that is in the latter clock domain is given by gp_gi_kalignlck.

Note that the logic in FIG. 5 allows the flag to be deasserted, when and only if a subsequent symbol processing stage requests that the alignment process be redone, by asserting reset-lock. This signal may be asynchronous, and is clock crossed to the receive clock domain (grxclk) before the kalignlck flag is reset (see the example logic 420 in FIG. 4A).

In the embodiment described above, the symbol alignment logic asserts the lock flag immediately upon seeing a lock, e.g. a 10-bit section in a storage bank matching the predefined non-data symbol. Referring back to FIG. 2, a link training state machine (LTSM) 604 of the interface 124 (see FIG. 1), in response to this lock flag being asserted, begins analysis of the symbols that are now being provided by the alignment logic, and looks for a predefined training sequence of symbols. If a particular predefined training sequence is then found by the LTSM 604, within a predefined period of time after the lock flag was asserted, then the lock flag is sustained. Otherwise, however, the LTSM signals the symbol alignment logic to redo the alignment process by asserting reset-lock (see FIG. 5). Note that there may be several different situations that may call for the alignment process to be performed again. These include, in addition to, the loss of synchronization at the receive clock, a failure to receive a predefined training sequence (e.g. a PCI Express TS1/TS2 Ordered Set, where the COM symbol that caused the lock flag to be asserted is the first symbol of the Ordered Set) within a given period of time, another failure during training of the serial point to point link, and a power management command.

An advantage of the above-described method and apparatus for symbol alignment is that it is a relatively robust technique that provides the important function of symbol alignment for a serial point to point link. A failure in the symbol alignment process means incorrect information will be forwarded to the next symbol processing stage, so that the link cannot become operational unless proper symbol alignment is taking place. Note that the symbol alignment process may be performed not only during initial training, prior to bringing a link into operation after power up, but also during reception of perhaps every packet by the IC device (where it is assumed that each packet will include one or more instances of the special, non-data symbol every so often so as to allow the symbol alignment to be repeated during normal operation of a given lane, whenever necessary to reconfirm symbol alignment). The design of the logic circuitry above is particularly suitable for allowing this on the fly request for realignment to be processed efficiently.

Other System Embodiments

The above-described link interface circuitry and methodology may also be implemented in IC devices that are designed to communicate via a serial, point to point interconnect technology that provides isochronous support for multimedia. Isochronous support is a specific type of QoS (Quality of Service) guarantee that data is delivered using a deterministic and time-dependent method. Platform-based isochronous support relies on a documented system design methodology that allows an application that requires a constant or dedicated level of access to system resources to gain the required bandwidth at a given time interval.

Figure 6:
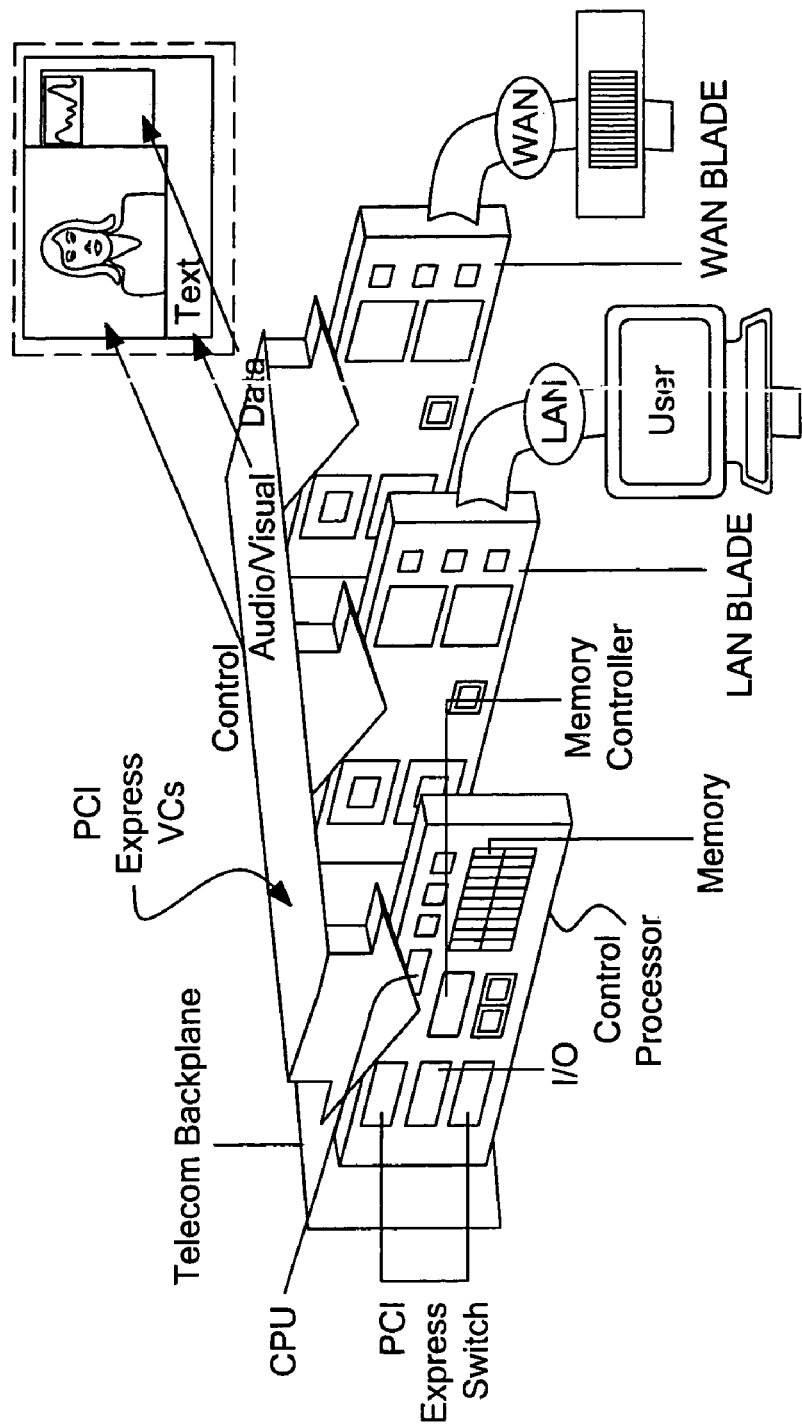
FIG. 6 identifies the various elements of a multi-media desktop personal computer some of which are communicationally coupled to each other via PCI Express virtual channels (VCs).

An example is that of watching an employee broadcast that originates from the company's CEO, on a desktop while working on a report, as shown in FIG. 6. Data is routed from the intranet into the desktop main memory where the application utilizes the data to create an audio stream sent to the user's headphones via an add-in card and a video stream sent to the display via a graphics controller. If simultaneous operations are occurring within the desktop personal computer (PC), such as disk reads, data coming off the Internet, word processing, email, and so on, there is no guarantee that the audio and video stream will be truly glitchless. Data is delivered on a "best effort" method only. The user may experience skips or stalls as applications compete for the same resources. Isochrony in PCI Express solves this problem by establishing a mechanism to guarantee that time-sensitive applications are able to secure adequate system resources. For example, in FIG. 6, the video time-sensitive data would be guaranteed adequate bandwidth to prevent skips at the expense of non-critical data such as email.

The above-described link interface circuitry and methodology may also be implemented in IC devices that are designed to communicate via a serial point to point link technology that is used in communications equipment, from embedded applications to chassis-based switching systems. In advanced switching, mechanisms are provided to send packets peer-to-peer through the switch fabric. These markets also benefit from the server class hardware-based error detection that is available with PCI Express. There may be two main types of usages within communications equipment, control plane processing and data plane processing. Control plane refers to the control and configuration of the system. The serial link may be used as the interface to configure and control processors and cards within a large number of systems. Chassis-based building switches typically have various cards that can be inserted and used. Chassis-based switches may offer field-upgradeability. Most switching systems offer the ability to only populate half of the chassis initially and add cards with additional ports or faster speed connections as demand or the number of users increase. The serial link technology could be used as a control plane interconnect to configure and monitor the different types of cards installed within the system. The enumeration and established configuration protocol within PCI Express, for example, lends itself to a low pin count, high bandwidth interface to configure cards and services.

The data plane refers to the actual path that the data flows. In the data plane, an advanced switching extension may define mechanisms to encapsulate and send PCI Express data packets across peer-to-peer links through the switch fabric.

The PCI Express core architecture may provide a solid foundation for meeting new interconnect needs. The Advanced Switching (AS) architecture overlays on this core and establishes an efficient, scalable, and extensible switch fabric through the use of a specific AS header inserted in front of the PCI Express data packet at the Transaction Layer. AS switches only examine the contents of the header that provide routing information (where to send the packet), traffic class ID (quality of service information), congestion avoidance (for preventing traffic jams), packet size, and protocol encapsulation. By separating the routing information, switch designs are simpler and cost-effective. Additionally, adding an external header to the packet enables the switch fabric to encapsulate any number of existing protocols.

Figure 7:
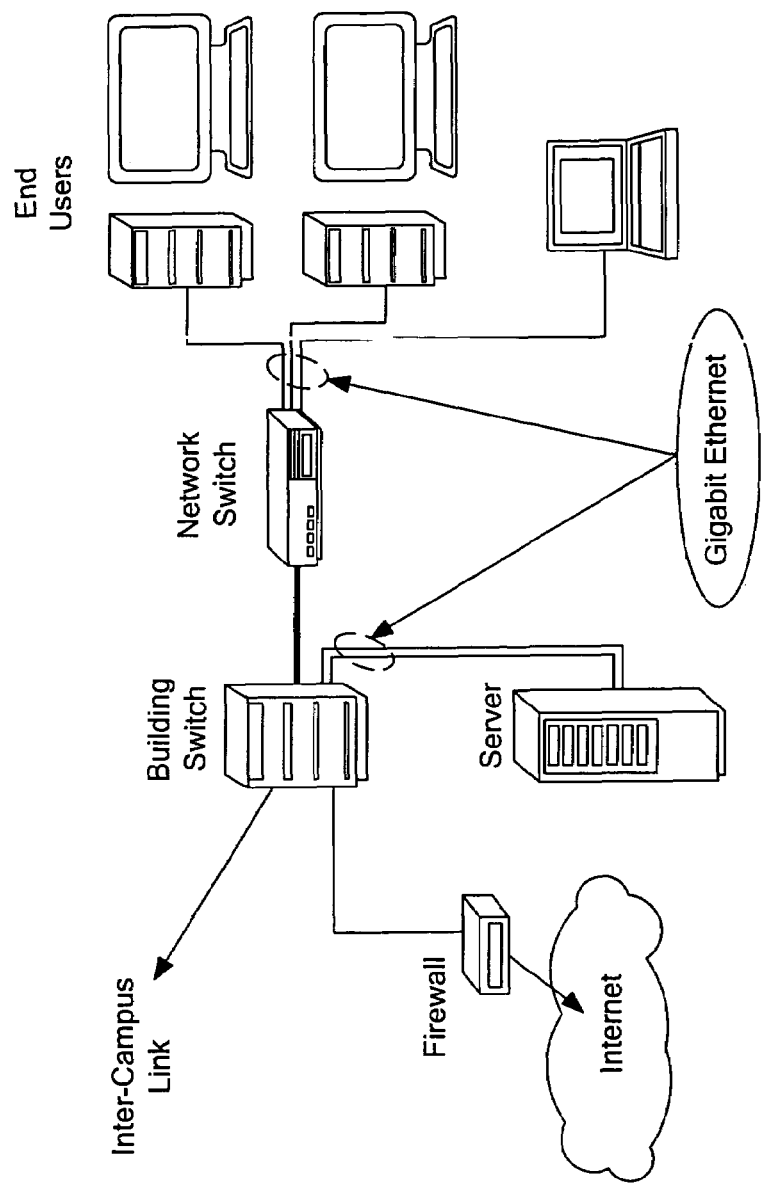
FIG. 7 depicts a block diagram of an enterprise network.

The above-described link interface circuitry and methodology may also be implemented in IC devices that are designed to communicate via a serial point to point interconnect technology that is used for network connections (in place of Gigabit Ethernet, for example). The network connection may be for corporate mobile and desktop computers for sharing files, sending emails, and browsing the Internet. Servers as well as communications equipment may be expected to implement such network connections. An example of such a network connection within the enterprise network is shown in FIG. 7.

Although the above examples may describe embodiments of the invention in the context of combinational and sequential logic circuits, other embodiments of the invention can be implemented by way of software. For example, some embodiments may be provided as a computer program product or software which may include a machine or computer-readable medium having stored thereon instructions which may be used to program a computer (or other electronic devices) to perform a process according to an embodiment of the invention. In other embodiments, operations might be performed by specific hardware components that contain microcode, hardwired logic, or by any combination of programmed computer components and custom hardware components.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that features an embodiment of the invention.

To summarize, various embodiments of a method and apparatus for receiver symbol alignment for a serial point to point link have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, although a system embodiment has been described using the serial point to point link as a chip to chip connection between two devices on a printed wiring board such as in a desktop, server, or notebook computer, the symbol alignment technique may also be used with serial point to point links that are part of an external bus for connecting the computer to a peripheral such as a keyboard, monitor, external mass storage device, or camera. The point to point link may be used in not only computer systems, but also dedicated communications products such as mobile phone units, telecommunication switches, and data network routers. The specification and drawings are, accordingly, to be regarded in an illustrative rather than a restrictive sense.

What is claimed is:

1. A method comprising:
   a) receiving a stream of bits in a first integrated circuit (IC) device, the stream represents a sequence of symbols transmitted by a second IC device over a serial point to point link that couples the first and second devices, wherein each of the symbols is M, an integer greater than one, bits long;
   b) comparing a first M-bit section of the stream to a non-data symbol;
   c) comparing a second M-bit section of the stream to the non-data symbol, the second section being offset by one bit in the stream relative to the first section;
   d) if there is a match between the second section and the non-data symbol, then asserting a flag indicating symbol alignment and treating, in the first device, each of a plurality of consecutive, non-overlapping M-bit sections that immediately follow the second section to be a separate symbol; and
   e) determining whether or not the plurality of M-bit sections that follow the second section are a predefined training sequence that has an instance of the non-data symbol, and if not then deasserting the flag to indicate no symbol alignment and if yes then sustaining the flag.

2. The method of claim 1 wherein the non-data symbol is designed to be unlikely to match any group of M consecutive bits in the stream unless the second device had knowledge that it was transmitting the non-data symbol.

3. The method of claim 1 wherein the non-data symbol is a COM (comma) symbol under PCI Express.

4. The method of claim 1 further comprising, after d):
   comparing a group of symbols, received in the first device following the first section, to a group of training symbols, and if there is a mismatch between those two groups then deasserting the flag.

5. An integrated circuit (IC) device comprising:
   an analog front end (AFE) to transmit and receive streams of information that represent sequences of M-bit symbols, M being an integer greater than one, the AFE being part of a serial point to point link between the IC device and another IC device; and
   alignment logic that includes a) a section formation circuit to receive a stream of information from the AFE that was transmitted by said another IC device, the section formation circuit having M storage banks to capture a plurality of M-bit sections of the stream, respectively, each of the plurality of M-bit sections being offset by one bit in the stream relative to its adjacent section, b) a comparator circuit having an input coupled to the M storage banks, the comparator circuit to compare each of the captured plurality of M-bit sections to a stored non-data symbol value and in response provide M bank hit signals, c) a priority encoder circuit having an input coupled to receive the M bank hit signals, d) a multiplexer circuit having an input coupled to the M storage banks and a control input coupled to an output of the encoder circuit.

6. The integrated circuit of claim 5 wherein the alignment logic further comprises control logic coupled to the output of the comparator circuit to assert a lock signal in response to any of the M bank hit signals being asserted, the lock signal when asserted enables the multiplexer to select M-bit sections from one of the M storage banks indicated by the output of the encoder circuit.

7. The integrated circuit of claim 6 further comprising:
   a link training state machine (LTSM) having an input coupled to an output of the multiplexer, the LTSM to begin checking the output of the multiplexer circuit for a predefined training sequence of symbols in response to the lock signal being asserted, and if the predefined training sequence is not detected within a predefined number of clock cycles following assertion of the lock signal, then signaling the control logic to deassert the lock signal.

8. The integrated circuit of claim 5 wherein the analog front end (AFE) is to receive streams of information, which represent sequences of M-bit symbols, in accordance with a receive clock, and the alignment logic is clocked by the receive clock.

9. The integrated circuit of claim 5 wherein the non-data symbol value is the value given to the COM (comma) symbol under PCI Express.

10. A system comprising:
    a processor;
    a main memory; and
    an integrated circuit (IC) device which is communicatively coupled to the processor and the main memory and provides the processor with input/output, I/O, access, the IC device having link interface circuitry that supports a serial, point to point link, the circuitry having
    an analog front end (AFE) to transmit and receive streams of information that represent sequences of M-bit symbols between a root complex and another device, where M is a positive integer greater than one, and
    alignment logic that includes a) a section formation circuit to receive a stream of information from the AFE that was transmitted by said another device, the section formation circuit having M storage banks to capture a plurality of M-bit sections of the stream, respectively, each of the plurality of M-bit sections being offset by one bit in the stream relative to an adjacent section, b) a comparator circuit having an input coupled to the M storage banks, the comparator circuit to compare each of the captured plurality of M-bit sections to a stored non-data symbol value and in response provide M bank hit signals at its output, c) a priority encoder circuit to receive the M bank hit signals and d) a multiplexer circuit having an input coupled to the M storage banks and a control input coupled to an output of the priority encoder circuit.

11. The system of claim 10 wherein the alignment logic further comprises control logic coupled to the output of the comparator circuit to assert a lock signal in response to any of the M bank hit signals being asserted, the lock signal when asserted enables the multiplexer to select M-bit sections from one of the M storage banks.

12. The system of claim 10 further comprising:
    a link training state machine (LTSM) having an input coupled to an output of the multiplexer, the LTSM to begin checking the output of the multiplexer for a training sequence of symbols in response to the lock signal being asserted, and if the training sequence is not detected within a predefined number of clock cycles following assertion of the lock signal, then signaling the control logic to deassert the lock signal.

13. The system of claim 10 wherein the analog front end (AYE) is to receive streams of information, which represent sequences of M-bit symbols, in accordance with a receive clock, and the alignment logic is clocked by the receive clock.

14. The system of claim 10 further comprising a graphics element, and wherein the IC device is a graphics and memory controller hub (GMCH) that communicatively couples the processor to the main memory and the graphics element.

15. The system of claim 13 wherein the receive clock is derived by the AFE from a transmit clock that is embedded in a transmission by said another device.

16. The system of claim 10 wherein the IC device is an I/O controller hub (ICH) that communicatively couples the processor to peripheral devices.

* * * * *